United States Patent [19]

Herndon

[11] Patent Number: 4,667,901
[45] Date of Patent: May 26, 1987

[54] APPARATUS FOR ADJUSTABLY MOUNTING AN EJECTION SEAT IN AN AIRCRAFT

[75] Inventor: Gerald F. Herndon, Bellevue, Wash.

[73] Assignee: The Boeing Company, Seattle, Wash.

[21] Appl. No.: 656,133

[22] Filed: Sep. 27, 1984

[51] Int. Cl.⁴ .............................................. B64D 25/10
[52] U.S. Cl. ........................ 244/122 AC; 244/122 A; 297/346
[58] Field of Search ........ 244/122 R, 122 A, 122 AB, 244/122 AC, 122 AD, 122 AE; 297/345, 346

[56] References Cited

U.S. PATENT DOCUMENTS

| | | | |
|---|---|---|---|
| 2,148,953 | 2/1939 | Meissner | 244/122 R |
| 2,702,677 | 2/1955 | Replogle | 244/122 A |
| 2,726,831 | 12/1955 | Bleck et al. | 244/122 A |
| 2,836,222 | 5/1958 | Martin | 244/122 AE |
| 3,098,631 | 7/1963 | Hall et al. | 244/122 |
| 3,826,434 | 7/1974 | Von Beckh | 244/122 |
| 4,128,217 | 12/1978 | Mazelsky | 244/122 |
| 4,408,738 | 10/1983 | Mazelsky | 244/122 |
| 4,423,848 | 1/1984 | Mazelsky | 244/122 |

FOREIGN PATENT DOCUMENTS

| | | | |
|---|---|---|---|
| 675982 | 5/1939 | Fed. Rep. of Germany | 244/122 R |
| 1909740 | 10/1969 | Fed. Rep. of Germany | 244/122 AC |
| 965458 | 7/1964 | United Kingdom | 244/122 AC |

Primary Examiner—Trygve M. Blix
Assistant Examiner—Rodney Corl
Attorney, Agent, or Firm—Eugene O. Heberer

[57] ABSTRACT

Apparatus for adjustably mounting an ejection seat (16) in an aircraft in which outer catapult cylinders (58, 60) support inner catapult cylinders (62, 64) and supply force to the inner cylinders to eject the inner cylinders and the seat from the aircraft, the inner cylinders being connected to an upper rear end of the seat (66, 68). The seat (16) is supported in the aircraft by the inner and outer catapult cylinders (62, 64, 58, 60), by adjusting actuators (40) to raise and lower and to tilt the seat forwardly and rearwardly, by lower anchor links (30) pivotally connected to the aircraft and to lower end (26, 28) of the outer catapult cylinders and to the actuators (40), and by upper links (50). The seat is connected to the catapult cylinders (58, 60) by slipper blocks 82. The slipper blocks (82) are pivotally connected to the seat by pins (84) and are slidably engaged with the outer catapult cylinders.

21 Claims, 9 Drawing Figures

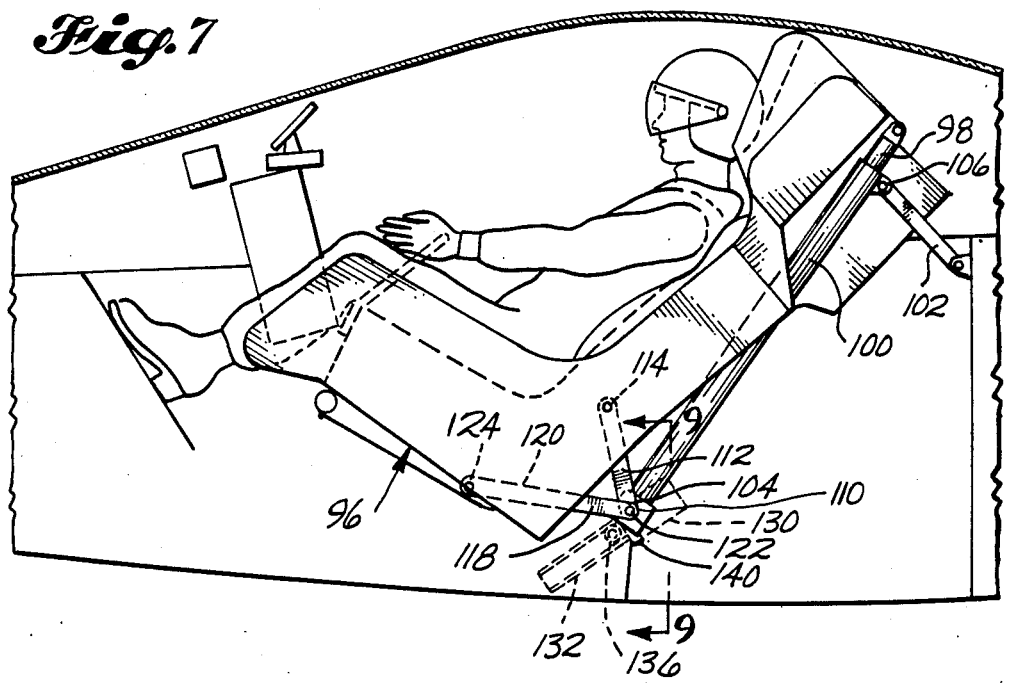
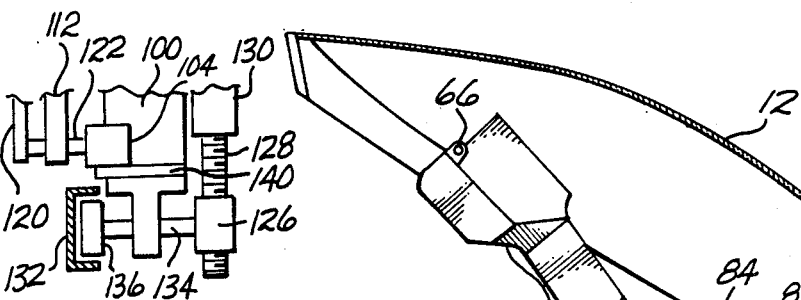
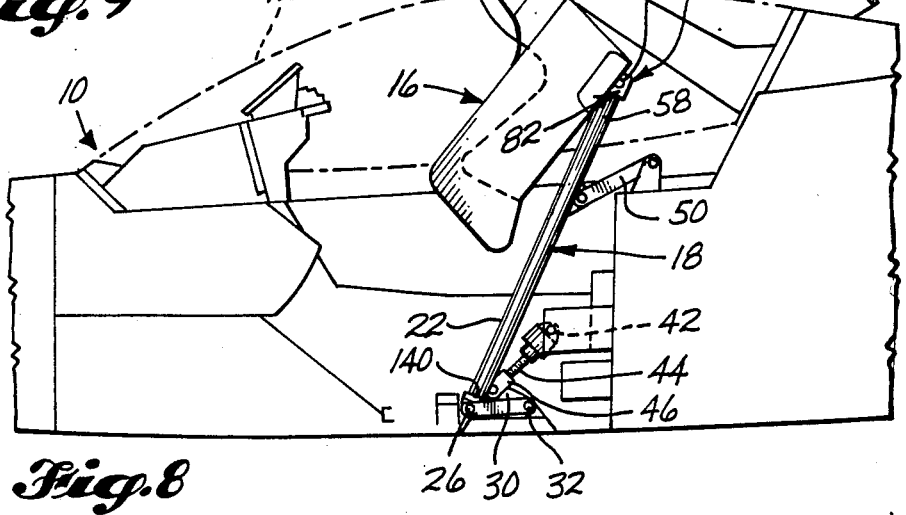

APPARATUS FOR ADJUSTABLY MOUNTING AN EJECTION SEAT IN AN AIRCRAFT

DESCRIPTION

1. Technical Field

The invention relates to ejection seats for high performance military aircraft, and more particularly, to seat mounting and adjustment structure relative to crew member size and proper line of sight positioning.

2. Background Art

Prior art ejection seats used in high performance military aircraft have been attached to aircraft structure by fixed rails and roller or slider mounting systems. Seat position adjustment, to accommodate for various sized crew members, has been accomplished with screw actuators to slide the seat up or down primary fixed rails, or secondary rails depending upon the type of seat construction involved.

It is essential to maintain a proper eye point location and line of sight for crew members to operate sophisticated head-up display systems in the aircraft. Because of typical seat back inclination angles, vertical translation of the eye point to coincide with the proper line of sight, results in fore and aft translation, which affects the reach limits of the crew members.

It has been determined that it would be desirable to have a seat adjustment method which is more adaptable in terms of crew member reach as well as proper line of sight positioning. Translating the seat vertically or pitching it forwardly while raising it, rather than translating parallel to fixed rails, would result in better reach positioning for small crew members. However, two actuating systems would be required to achieve upward translation and forward pitching motion with rail mounted seats; that is, the normal actuation along the rails and a second actuator to rotate the rail system about a pivot at its lower end. This, however, would add substantial complexity to the seat adjustment system.

A search of the patent literature discloses various seat adjustment or related structures, as follows:

U.S. Pat. No. 2,813,690: B. B. Holmes
U.S. Pat. No. 3,098,631: A. A. Hall et al
U.S. Pat. No. 3,826,434: H. J. Von Beckh
U.S. Pat. No. 3,841,328: J. Jensen
U.S. Pat. No. 4,128,217: B. Malzesky
U.S. Pat. No. 4,408,738: B. Malzesky
U.S. Pat. No. 4,423,848: B. Malzesky

DISCLOSURE OF THE INVENTION

The invention includes two embodiments for seat mounting and adjustment, one using a dual four bar linkage mechanism and the other a dual link slider system, each of the embodiments having the capability of removing the seat from an aircraft without removing the canopy.

The invention includes ejection power delivery means or outer catapult cylinders for supporting ejection means or inner catapult cylinders and for supplying force in the form of gas pressure to the inner cylinders to eject them from the outer cylinders and to eject the seat from an aircraft. The inner cylinders are adapted to be connected to an ejection seat to carry the seat out of the aircraft.

In the four bar linkage mechanism, the seat is supported in the aircraft by a dual set of inner and outer catapult cylinders, each set forming one link, adjusting actuators connecting lower anchor links to the aircraft, the lower links being pivotally engaged at one end to the aircraft and at the other end to lower ends of the outer catapult cylinders, upper links connecting an intermediate portion of the outer catapults to the aircraft, and the fourth link being formed by aircraft structure supporting the upper and lower links.

The catapults are positioned to the rear of the back of the seat, one catapult being adjacent each of the respective opposite sides of the seat. The outer catapults support the seat, guide the seat during ejection, and provide a means for delivering the ejection power in the form of a gas to the inner catapult cylinders to eject the seat. The actuators adjust the seat by raising and lowering the outer catapults by pivoting the lower anchor links which raise, lower, and tilt the seat.

Slipper blocks are connected to the lower rear ends of the seat and are in slidable engagement with the outer catapult cylinders. They are ejected with the seat and are disengaged from the outer catapults at the outer ends thereof as the seat is being ejected. The slipper blocks react the seat applied forces and moments.

In an alternate embodiment, the slipper blocks are connected to a structure formed by two links which are fixed to the seat, the links being ejected with the seat and carrying the slipper blocks with them as they leave the outer catapult cylinders. In this embodiment actuators have one end connected to the aircraft and have their other end connected to a roller shaft on the lower end of the outer catapult cylinder. The roller is in rolling engagement with a track secured to the aircraft. The actuators are operable to move the rollers within and along the track so as to be capable of raising and lowering and tilting the seat forwardly and rearwardly.

In both embodiments the catapults are removably connected to the seat so that when they are disconnected at their upper ends the seat may be rotated on the slipper blocks and the slipper blocks may be slid outwardly on the outer cylinders and removed therefrom at their outer end so that the seat may be removed from the aircraft without removing the canopy.

Novel features and/or advantages of the invention are: the use of four bar linkage or link slider systems to support the seat while providing a variable geometry adjustment capability, the use of catapult cylinders as links in the support mechanism for the ejection seats, use of the outer surface of the catapult cylinders as guide tracks for the slipper blocks, the capability of removing the seat without removing the canopy, and the upper bearing of the outer catapult cylinders and the slipper blocks react the seat applied moments. The linkage can be designed to achieve any one of a variety of different seat adjustment paths, from forward pitching to near vertical translation, or a path nearly parallel to the seat back plane, as is the motion of the fixed rail mounted seats.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 7 is a side elevational view of an ejection seat, illustrating alternate structures for adjusting the seat and connecting the adjustment means with the seat;

FIG. 8 is a side elevational view illustrating the removal of the seat from the aircraft without removal of the canopy, according to the invention; and FIG. 9 is a fragmentary view taken substantially along the lines 9—9 in FIG. 7.

BEST MODE FOR CARRYING OUT THE INVENTION

Figure 1:
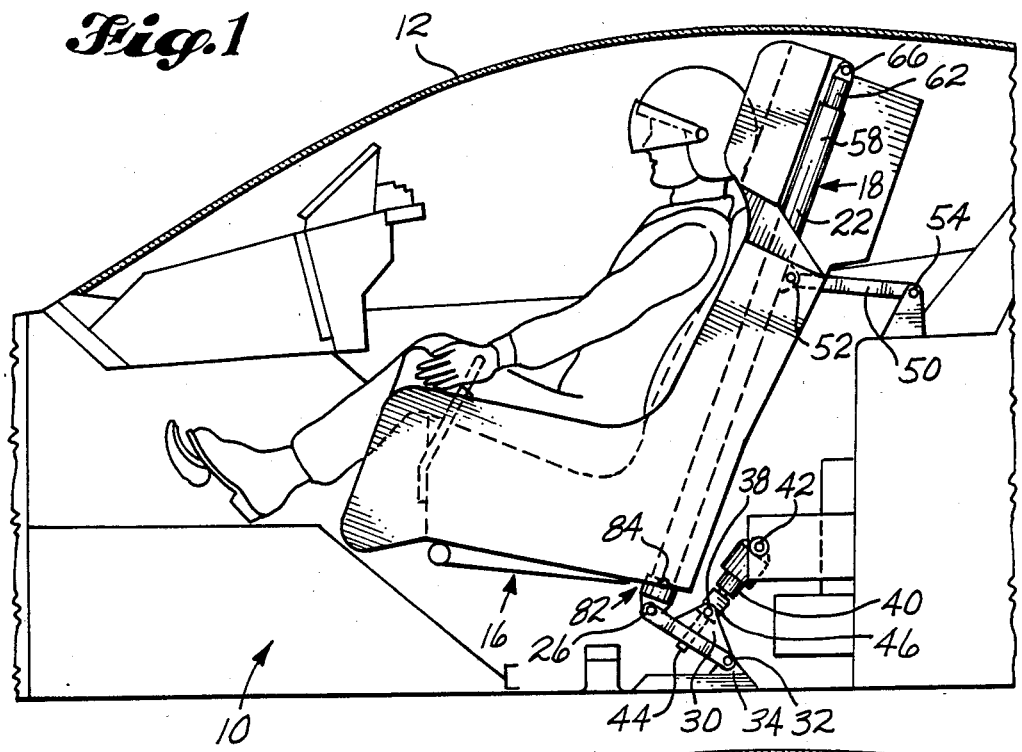
FIG. 1 is a side elevational view of an ejection seat, adjusted, according to the invention, to be in a raised position for the benefit of a relatively small occupant.
Figure 2:
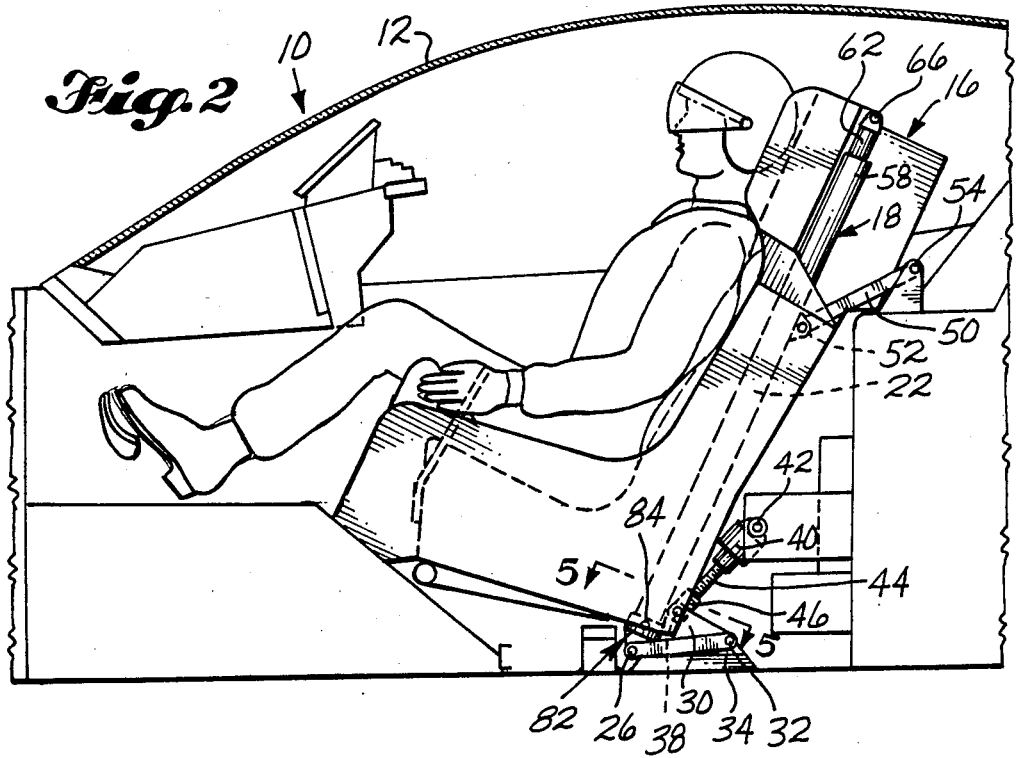
FIG. 2 is a side elevational view of the seat shown in FIG. 1, in a lowered adjusted position for use by an occupant larger than shown in FIG. 1.
Figure 3:
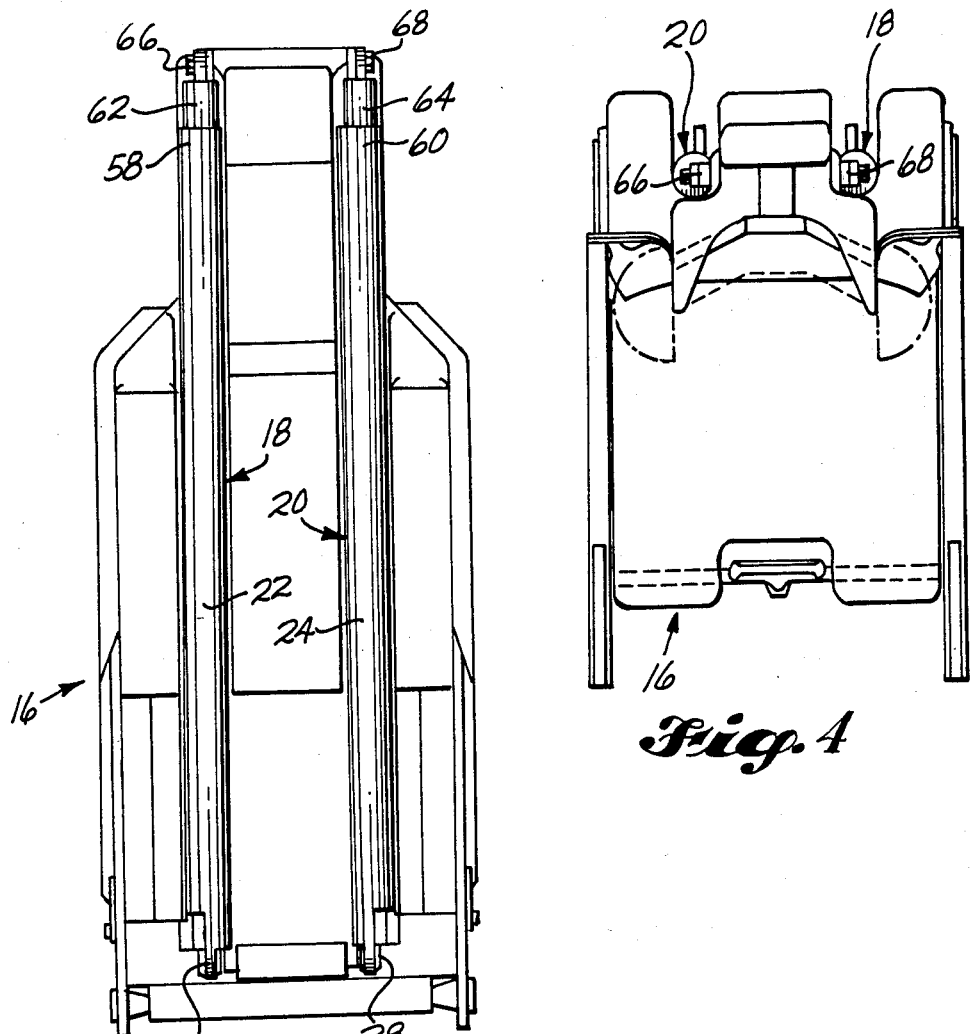
FIG. 3 is a rear elevational view of the seat shown in FIGS. 1 and 2, provided primarily to illustrate the arrangement of the catapults with the seat.
Figure 4:
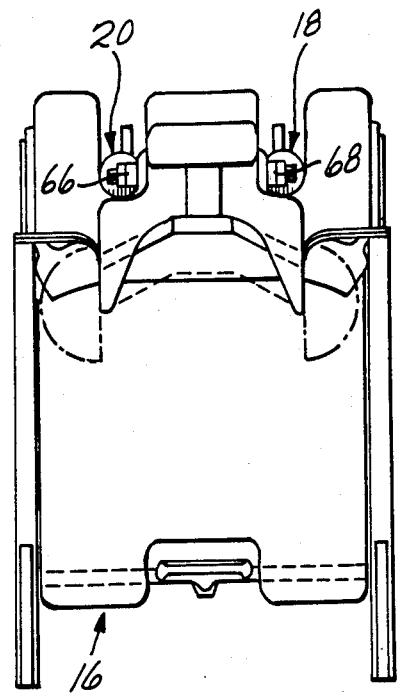
FIG. 4 is a plan view of the seat taken from the top and being provided primarily to illustrate the catapult arrangement.

Referring again to the drawings, there is shown in FIGS. 1, 2 and 8 a fragmentary view of an aircraft cockpit, generally designated as 10, having a canopy 12 in a closed, locked position in FIG. 1 and 2 and in a pivotally opened position in FIG. 8. An ejection seat, generally designated as 16, is supported in the aircraft by a four bar linkage mechanism, comprised of a pair of catapults 18 and 20, FIGS. 3, 4, positioned on the rear of the seat, adjacent opposite sides. Outer catapult cylinders or ejection power delivery means 22 and 24 are pivotally secured at their lower ends 26 and 28 to lower triangular shaped anchor links 30, having one end 32 pivotally secured to the aircraft at 34.

The link 30 is pivotally connected at 38 to a motor driven actuator 40 which is pivotally connected to aircraft structure at 42. A threaded shaft 44, driven by the actuator, has a non-rotatable nut 46 by which the actuator is pivotally connected to the link at 38.

Each outer catapult cylinder is supported upwardly intermediate its ends by an upper anchor link 50, pivotally engaged at one end 52 to an outer cylinder and pivotally engaged at its other end 54 to the aircraft structure. Upper ends 58 and 60 of the outer cylinders are positioned adjacent the upper end of the seat and in each of the other cylinders there extends an ejection means or inner cylinders 62 and 64 having their outer ends removably secured to the upper end of the seat at 66 and 68.

Figure 6:
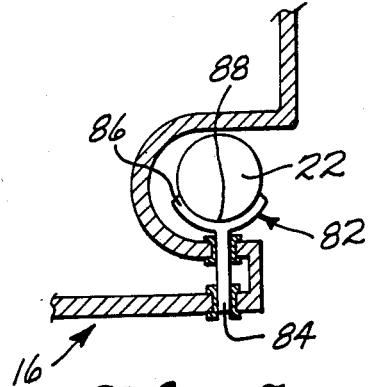
FIG. 6 is a fragmentary cross-sectional view, illustrating locking means for holding the catapults in place during normal use of the seat.

As shown in FIG. 6, the inner and outer cylinders, as 58 and 62, are normally locked together by a pin 70 extending into a bore 72 in the wall of the outer catapult tube. At the inner end of the pin there is a piston 74 normally engaged by a spring 76 to hold the pin in the locked position. The piston 74 is within a closed chamber having an orifice 78 which when ejection gases enter the outer cylinders of the catapults, by means not shown, the gas enters the orifices 78 to move the piston to the left and to move the pin out of the bore 72 to permit the inner cylinders to be moved outwardly to eject the seat from the aircraft.

During normal use the four links are thus formed by the locked inner and outer catapult cylinders, the lower anchor links 30, the upper anchor links 50 and the aircraft structure to which the links are pivotally connected.

Figure 5:
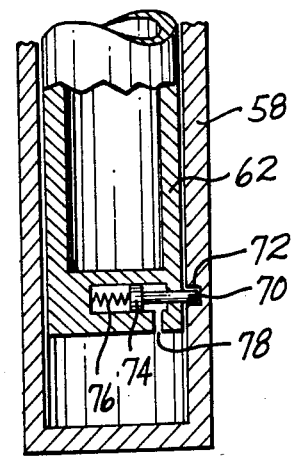
FIG. 5 is a fragmentary view taken along the lines 5—5 in FIG. 2.

At each of lower rear ends of the seat are slipper blocks 82, best seen in FIG. 5, supported on pins 84 for rotatable engagement with respect to the seat, and on the inner ends of the pins there is a fractional cylindrical portion 86, having a concave surface 88 approximately equal to ⅓ of a circle and having the same approximate radius as the outer catapults so as to be slidably engaged therewith. The slipper blocks are free to change positions with respect to the seat to maintain their fit on the outer catapult surfaces. In bearing on the outer catapult cylindrical surface the slipper blocks react the seat applied moments. During ejection the slipper blocks slide outwardly on the outer catapult cylinders and move off of the cylinders at their outer ends. The slipper blocks are guided by the convex surfaces of the catapult outer cylinders so as to guide the seat outwardly of the aircraft during ejection.

As may be seen in FIGS. 1 and 2, to adjust the seat for proper line of sight positioning of a crew member in accordance with the crew member's height, electrically driven actuator motors are energized to rotate the threaded shaft 44. In FIG. 1 the seat is at its highest and most forwardly position as would be required for a relatively small crew member. Rotation of the threaded shaft 44 in the non-rotatable nut 46 causes the nut to be moved downwardly so that the anchor link 30 also moves downwardly at 26 to its lowest position, as shown in FIG. 2. Because the entire seat is supported at the rear, as described, the seat pivots downwardly and slightly rearwardly in accordance with the movement of the pivotal connection at 52 of the upper anchor link 50.

In FIG. 8 the ability to remove the seat 16 from the aircraft without removing the canopy 12 is illustrated. This is made possible by first removing the inner catapult cylinders 62 and 64 from their connections at 66 and 68 and withdrawn from the outer catapult cylinders. The seat is then raised on the outer cylinders, the slipper blocks 82, sliding upwardly along with the seat and when the blocks reach the top of the outer catapults, the seat is lifted from the catapults and removed from the aircraft while the canopy remains in open position on the aircraft. As the seat is raised, sliding upwardly on a catapults, it may be rotated so that the backrest faces substantially downwardly.

In FIG. 7 a second embodiment of the invention is illustrated. Here the seat 96, the inner catapult cylinders 98, the outer catapult cylinders 100, the upper anchor links 102, and the slipper blocks 104 are essentially the same as that shown in FIGS. 1 and 2. The differences are in the connection of the catapults and the actuating adjuster.

In this embodiment the upper anchor link 102 is pivotally connected at 106, adjacent the outer end of the outer catapults. The slipper blocks 104 are of the same general configuration as the slipper blocks 82 but are not directly connected to the seat. Instead they are pivotally connected at 122 to outer ends 110 of tandem compression links 112 which have their inner ends 114 fixed to opposite sides of the seat. Ends 118 of tension links 120 are pivotally connected to slipper blocks 104 at pivots 122. Inner ends 124 of the links 120 are fixed to the seat.

As shown in FIG. 9, motor driven actuators 130 are secured to the aircraft and have threaded shafts 128 engaged in non-rotatable nuts 126 supported on pins 134 secured to the lower ends of the catapults 100. Short channel-shaped tracks 132 extend downwardly from aircraft supports and rollers 136 are bearing mounted on the pins 134 and are positioned for slidable engagement with tracks 132 on each side of the seat.

In FIG. 7 the seat is shown in its upper position with the roller moved upwardly with the end of the threaded shaft of the actuator. When the seat is to be adjusted downwardly for a larger occupant or for proper line of sight positioning of the occupant, the threaded shaft moves the roller 136 so that it slides downwardly in the track 132 and guides the catapult, slipper block 104, links 112, 120 and the seat downwardly. The track 132 has a length no greater than that required for the adjustment to raise and lower and to tilt the seat forwardly and rearwardly.

The lower end of the catapults have stop rings 140 to prevent the slipper blocks 104 from moving off of the catapults in the downwardly direction. In the upwardly adjustment the ring 140 on the lower end of the catapult moves the slipper block upwardly as the roller is moved upwardly by the actuator. The relative positions of the links 112, 120 and the slipper block 104 remain the same during the seat adjustment. The links 102 also are rotated downwardly as the outer catapults are moved downwardly.

The link slider concept illustrated in FIG. 7 occupies less space than the four link concept illustrated in FIGS. 1 and 2.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. Apparatus for adjustably mounting an ejection seat in an aircraft, comprising:
    ejection means for being connectable to an ejection seat to carry the seat out of an aircraft;
    ejection power delivery means for supporting said ejection means in slidable contact with internal surfaces of the delivery means and for supplying force to the ejection means to eject the ejection means from an outer end of the power delivery means and the seat from the aircraft;
    seat support means for connecting the seat to the aircraft;
    said seat support means including the ejection means, the power delivery means, and adjustment means to raise and lower and to tilt the seat forwardly and rearwardly; and
    means for rotatable connection with respect to the seat and to fit on, be guided on, and ride on the ejection power delivery means directly outwardly of said internal surfaces to be free to change positions with respect to the seat to maintain the fit and riding positions on the delivery means from adjacent an inner end thereof to said outer end, for ejection with the seat and disengagement from the delivery means at said outer end.

2. Apparatus for adjustably mounting an ejection seat in an aircraft, comprising:
    ejection means for being connectable to an ejection seat to carry the seat out of an aircraft;
    ejection power delivery means for supporting said ejection means in slidable contact with internal surfaces of the delivery means and for supplying force to the ejection means to eject the ejection means from an outer end of the power delivery means and the seat from the aircraft;
    seat support means for connecting the seat to the aircraft;
    said seat support means including the ejection means, the power delivery means, and adjustment means to raise and lower and to tilt the seat forwardly and rearwardly; and
    means for rotatable connection with respect to the seat and to fit on and ride directly on external surfaces of the ejection power delivery means directly outwardly of said internal surfaces to be free to change positions angularly with respect to the seat to maintain the fit and riding positions on the delivery means from adjacent an inner end thereof to said outer end on said external surfaces, for ejection with the seat and disengagement from the delivery means at said outer end.

3. The invention according to claim 2 in which:
    said means for connection react the seat applied forces and moments.

4. The invention according to claim 2 in which:
    said means for connection are slipper blocks for rotatable mounting in the seat and for riding slidable engagement with the power delivery means; said slipper blocks having concave surfaces for said riding engagement with convex surfaces on the power delivery means.

5. The invention according to claim 2 in which:
    said means for connection are slipper blocks for riding slidable engagement with the power delivery means and having two fixed links for connecting the slipper blocks with the seat; said slipper blocks having concave surfaces for said riding engagement with convex surfaces on the power delivery means.

6. The invention according to claim 5 in which:
    the adjustment means are actuators having one end for securing to the aircraft and having the other end connected to a roller for rolling engagement in a track securable to the aircraft; said track having a length no greater than that required for the adjustment to raise and lower and to tilt the seat forwardly and rearwardly;
    the roller being connected for rotation to said inner end of the power delivery means, the inner end being opposite said outer end;
    whereby operation of an actuator to move the roller in the track, raises and lowers and tilts the seat forwardly and rearwardly.

7. The invention according to claim 4 in which:
    the adjustment means are actuators having one end for securing to the aircraft and having another end secured to a lower anchor link to pivot the same;
    the lower link having one end for pivotally securing to the aircraft and having another end pivotally secured to said inner end of the power delivery means, the inner end being opposite said outer end, whereby operation of an actuator pivots the lower link at its pivoted ends to raise and lower and tilt the seat forwardly and rearwardly.

8. The invention according to claim 7 in which:
upper anchor links have one end pivotally secured to the power delivery means intermediate said inner end and said outer end;
the other ends of the upper links being pivotally securable to the aircraft.

9. The invention according to claim 6 in which:
upper anchor links have one end pivotally secured to the power delivery means intermediate said inner end and said outer end;
the other ends of the upper links being pivotally securable to the aircraft.

10. The invention according to claim 2 in which:
said ejection power delivery means are outer catapult cylinders, one being positionable adjacent each of opposite rear sides of the seat; and
said ejection means are inner catapult cylinders, each being within a respective outer cylinder and having their outer ends securable adjacent the outer ends of the seat.

11. The invention according to claim 2 in which:
the ejection means are removably connectable to the seat;
said means for rotatable connection with respect to the seat being slidable on said power delivery means to be removable from said outer end,
whereby when the ejection means are disconnected from the seat, the seat may be rotated on the means for connection so that a backrest thereof may be rotated to face substantially downwardly and the means for connection may be slid outwardly to said outer end for removal, the seat may be removed from the aircraft without removing a canopy.

12. A seat mounted in an aircraft for ejection therefrom, comprising:
ejection means connected to the seat to carry the seat out of the aircraft;
ejection power delivery means supporting the ejection means in slidable contact with internal surfaces of the delivery means and for supplying force to the ejection means to eject the ejection means from an outer end of the power delivery means and the seat from the aircraft;
seat support means connecting the seat to the aircraft;
said seat support means including the ejection means, the power delivery means, and adjustment means to raise and lower and to tilt the seat forwardly and rearwardly; and
means for rotatable connection with respect to the seat and to fit on and ride directly on external surfaces of the ejection power delivery means directly outwardly of said internal surfaces to be free to change positions angularly with respect to the seat to maintain the fit and riding positions on the delivery means from adjacent an inner end thereof to said outer end on said external surfaces, for ejection with the seat and disengagement from the delivery means at said outer end.

13. The invention according to claim 12 in which:
said means for connection react the seat applied forces and moments.

14. The invention according to claim 12 in which:
said means for rotatable connection with respect to the seat are slipper blocks rotatably mounted in the seat and for riding slidably engaged with the power delivery means; said slipper blocks having concave surfaces for said riding engagement with convex surfaces on the power delivery means.

15. The invention according to claim 12 in which:
said means for rotatable connection with respect to the seat are slipper blocks in rideable slidable engagement with the power delivery means and having two fixed links connecting the slipper blocks with the seat; said slipper blocks having concave surfaces for said rideable engagement with convex surfaces on the power delivery means.

16. The invention according to claim 15 in which:
the adjustment means are actuators having one end secured to the aircraft and having the other end connected to a roller for rolling engagement in a track secured to the aircraft; said track having a length no greater than required for the adjustment to raise and lower and to tilt the seat forwardly and rearwardly;
the roller being connected for rotation to said inner end of the power delivery means, the inner end being opposite said outer end,
whereby operation of an actuator to move the roller in the track, raises and lowers and tilts the seat forwardly and rearwardly.

17. The invention according to claim 14 in which:
the adjustment means are actuators having one end secured to the aircraft and having the other end secured to a lower anchor link to pivot the same;
the lower link having one end pivotally secured to the aircraft and having another end pivotally secured to said inner end of the power delivery means, the inner end being opposite said outer end,
whereby operation of an actuator, pivots the lower link at its pivoted ends to raise and lower and tilt the seat forwardly and rearwardly.

18. The invention according to claim 17 in which:
upper anchor links have one end pivotally secured to a power delivery means intermediate said inner end and said outer end,
the other end of the upper links being pivotally secured to the aircraft.

19. The invention according to claim 15 in which:
upper anchor links have one end pivotally secured to a power delivery means intermediate said inner end and said outer end;
the other ends of the upper links being pivotally secured to the aircraft.

20. The invention according to claim 12 in which:
said ejection power delivery means are outer catapult cylinders, one being positioned adjacent each of opposite rear sides of the seat; and
said ejection means are inner catapult cylinders, each being within a respective outer cylinder and having their outer ends secured adjacent the outer ends of the seat.

21. The invention according to claim 12 in which:
the ejection means are removably connectable to the seat;
said means for rotatable connection with respect to the seat being slidable on said power delivery means to be removable from said outer end,
whereby when the ejection means are disconnected from the seat, the seat may be rotated on the means for connection so that a bracket thereof may be rotated to face substantially downwardly and the means for connection may be slid outwardly to said outer end for removal, the seat may be removed from the aircraft without removing a canopy.

* * * * *